United States Patent
Hiramatsu et al.

(10) Patent No.: US 6,600,933 B1
(45) Date of Patent: Jul. 29, 2003

(54) TRANSMISSION DIVERSITY METHOD

(75) Inventors: Katsuhiko Hiramatsu, Yokosuka (JP); Osamu Kato, Yokosuka (JP); Toyoki Ue, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/443,094

(22) PCT Filed: Apr. 2, 1999

(86) PCT No.: PCT/JP99/01735

§ 371 (c)(1),
(2), (4) Date: Nov. 23, 1999

(87) PCT Pub. No.: WO99/52229

PCT Pub. Date: Oct. 14, 1999

(30) Foreign Application Priority Data

Apr. 7, 1998 (JP) .......................................... 10-094953

(51) Int. Cl.[7] .............................................. H04B 1/38
(52) U.S. Cl. ...................................... 455/561; 455/522
(58) Field of Search ............................... 455/13.4, 500, 455/513, 517, 522, 527, 62, 67.1, 69, 561, 562, 525, 574, 422; 370/319, 344, 295, 281

(56) References Cited

U.S. PATENT DOCUMENTS

| 5,097,484 A | | 3/1992 | Akaiwa |
| 5,241,693 A | | 8/1993 | Kim et al. |
| 5,481,571 A | * | 1/1996 | Balachandran et al. ...... 375/347 |
| 5,828,658 A | * | 10/1998 | Ottersten et al. ........... 370/310 |
| 5,886,987 A | | 3/1999 | Yoshida et al. |
| 5,952,963 A | * | 9/1999 | Shen et al. .................. 342/367 |
| 5,970,061 A | * | 10/1999 | Kokudo ....................... 370/344 |
| 6,032,033 A | * | 2/2000 | Morris et al. ................ 370/334 |
| 6,141,531 A | * | 10/2000 | Williams et al. ................ 455/7 |
| 6,157,668 A | * | 12/2000 | Gilhousen et al. .......... 370/332 |
| 6,173,005 B1 | * | 1/2001 | Kotzin et al. ................ 375/141 |
| 6,314,304 B1 | * | 11/2001 | Uesugi ....................... 455/517 |
| 6,320,898 B1 | * | 11/2001 | Newson et al. .............. 375/144 |
| 6,396,867 B1 | * | 5/2002 | Tiedemann et al. ......... 370/342 |
| 6,445,917 B1 | * | 9/2002 | Bark et al. .................. 370/331 |

FOREIGN PATENT DOCUMENTS

| JP | 2-104030 | 4/1990 |
| JP | 9-8716 | 1/1997 |
| JP | 9-238098 | 9/1997 |
| JP | 9-247060 | 9/1997 |
| WO | 94/19876 | 9/1994 |

OTHER PUBLICATIONS

M. Hayashi et al., "An Experiment Performance of a Next Generation W–CDMA/TDD System", Technical Report of IEICE, SSE97–41, RSC97–36 (Jun. 1997), with English language abstract.
Abstract of W.I.P.O. 94/19876.
Abstract of W.I.P.O. 94/19876.

* cited by examiner

*Primary Examiner*—Nay Maung
*Assistant Examiner*—Jean A Gelin
(74) *Attorney, Agent, or Firm*—Greenblum & Bernstein, P.L.C.

(57) ABSTRACT

In radio FDD communication, reception quality is measured at a communication terminal, the measurement result is reported to a base station, and the base station changes a transmission antenna based on the reported result on the reception quality. Thereby, in the FDD system, the transmission antenna can be determined based on a received signal.

2 Claims, 8 Drawing Sheets

(a) WHEN FLAG = MESSAGE (b) WHEN FLAG = CONTROL INFORMATION

TRANSMISSION DIVERSITY METHOD

TECHNICAL FIELD

The present invention relates to a radio base station apparatus having a plurality of antennas, and a radio communication method.

BACKGROUND ART

A conventional radio communication apparatus is explained below, based on a reference, "Transmission Characteristic of W-CDMA/TDD System for Next Generation," IEICE Technical Report, SSE97-41, RCS97-36, The Institute of Electronics, Information, and Communication Engineers, Japan, June 1997. This reference discloses transmission antenna change diversity in a TDD (Time Division Duplex) system, as a type of space diversity, as follows.

A base station (BS) is provided with a plurality of antenna branches, combines diversity receptions in an up link, and employs transmission selection space diversity (SD) in a down link. In the up link, correlation values of respective branches and respective paths are combined in accordance with the maximal-ratio combining to perform demodulation. In the down link, received signal powers of communication channels are obtained by averaging the correlation values in the respective branches in the up link for a preceding slot (0.625 msec), and one of the antennas which maximizes received signal power is selected to transmit a slot (0.625 msec) in the down link through the selected antenna.

That is, according to the conventional technique, the correlation values (which correspond to received signal powers of desired signals) are calculated for the preceding slot for the respective branches (i.e., for the respective antennas) in the down link. Then, the antenna realizing a great received signal power is selected for transmitting a slot in the down link.

However, the above conventional technique has a problem. That is, since the same frequency is used in both the up and down links in the TDD system, the transmission antenna can be determined based on the received signals as above. On the other hand, different frequencies are used in transmission and reception in the frequency division duplex (FDD) systems. Therefore, a transmission antenna cannot be determined based on received signals as above for the transmission antenna change diversity in the FDD systems.

DISCLOSURE OF THE INVENTION

The object of the present invention is to provide a radio base station apparatus and a radio communication method whereby the radio base station can determine a transmission antenna based on received signals in frequency division duplex (FDD) communication.

BEST MODE FOR CARRYING OUT THE INVENTION

The embodiments of the present invention are explained below in detail with reference to the attached drawings.

Embodiment 1

Figure 1:
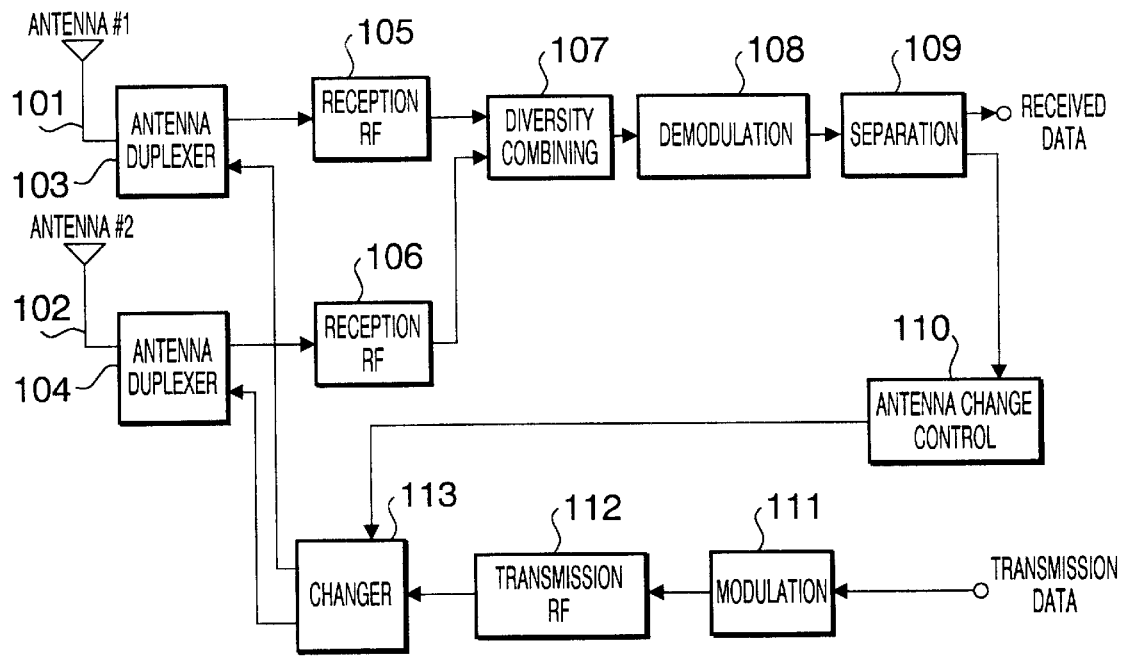
FIG. 1 is a block diagram illustrating a radio base station apparatus in the embodiment 1 of the present invention.

FIG. 1 is a block diagram illustrating the construction of the radio base station apparatus in the embodiment 1 of the present invention.

In the radio base station apparatus, a signal received by the antenna 101 is supplied to the reception RF circuit 105 through the antenna duplexer 103, which is provided for common use of the antenna 101 in transmission and reception. The reception RF circuit 105 amplifies the received signal, and performs frequency conversion to an intermediate frequency or a baseband frequency.

In addition, a signal received by the antenna 102 is supplied to the reception RF circuit 106. through the antenna duplexer 104, which is provided for common use of the antenna 102 in transmission and reception. The reception RF circuit 106 amplifies the received signal, and performs frequency conversion to an intermediate frequency or a baseband frequency.

The frequency-converted signals as diversity receptions are combined by the diversity combining circuit 107. Although the combination of the diversity receptions is not a necessary function, it is preferable to use the diversity receptions for improving the performance of the reception since the present radio base station apparatus has a plurality of antennas. Next, the result of the diversity receptions is demodulated by the demodulation circuit 108. The result of the demodulation is then supplied to the separation circuit 109, and is separated thereby into reception data and a control signal for antenna change control.

The antenna change control circuit 110 determines, based on the control signal, which of the antennas 101 and 102 is to be used for transmission, and supplies to the changer 113 a signal for changing from the current antenna to the determined antenna. The operation of the antenna change control circuit 110 is explained later.

In transmission, transmission data is modulated by the modulation circuit 111 to be supplied to the transmission RF circuit 112. The transmission RF circuit 112 converts the frequency of the transmission data, and amplifies the transmission data for supplying to the changer 113. The changer 113 changes the antenna used in transmission from one of the antennas 101 and 102 to the other, so that a transmission signal is transmitted through the antenna after the change.

Figure 2:
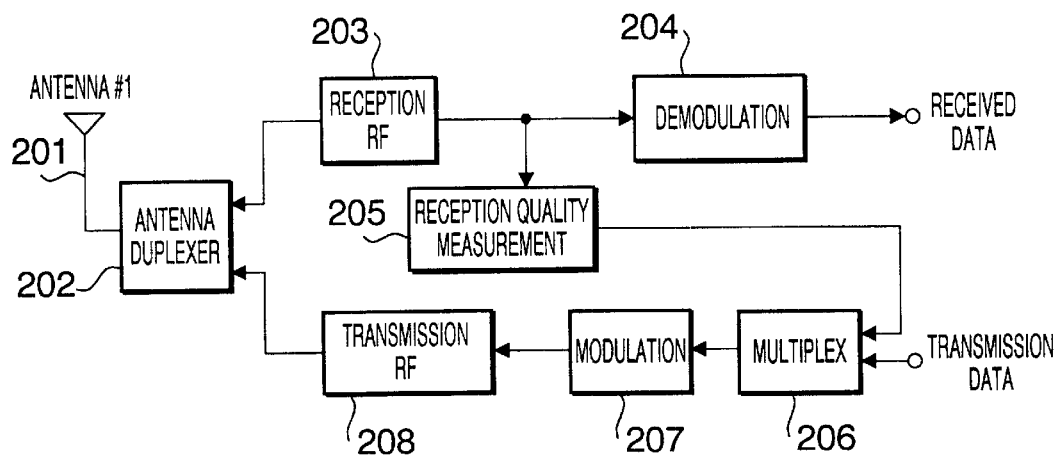
FIG. 2 is a block diagram illustrating a communication terminal which communicates with the radio base station apparatus in the embodiment 1 of the present invention.

FIG. 2 is a block diagram illustrating the construction of a communication terminal, such as a mobile station apparatus, which performs radio communication with the radio base station apparatus in the embodiment 1 of the present invention.

A signal received by the antenna 201 is supplied to the reception RF circuit 203 through the antenna duplexer 202, which is provided for common use of the antenna 202 in transmission and reception. The reception RF circuit 203 amplifies the received signal, and performs frequency conversion to an intermediate frequency or a baseband frequency. The frequency-converted signal is demodulated by the demodulation circuit 204. At the same time, the output of the reception RF circuit 203 is supplied to the reception quality measurement circuit 205, which measures a quantity representing the quality of the reception.

The quantity measured by the reception quality measurement circuit 205 may be, for example, received field strength, a received signal power of a desired signal, a ratio of a power of the received signal to an interference power (SIR), or a ratio of the power of the received signal to a sum of the interference power and a noise power (called Signal-to-Interference pulse Noise Ratio, and hereinafter referred to as SINR). The received field strength is obtained by measuring the power of the output of the reception RF circuit. The received field strength can be obtained by the simplest construction. The received field strength can be used for evaluating the reception quality in an environment in which no interference signal exists.

The received signal power of the desired signal can be measured by multiplying the received signal by a known signal. When the interference signal exists, the received field strength includes both the desired signal and the interference signal. However, information to be reported should be based on the received signal power of the desired signal which is needed in the communication terminal. Therefore, it is preferable to use the SINR for representing reception quality since the SINR is the most reliable information as an index for determining an error rate characteristic.

Figure 3:
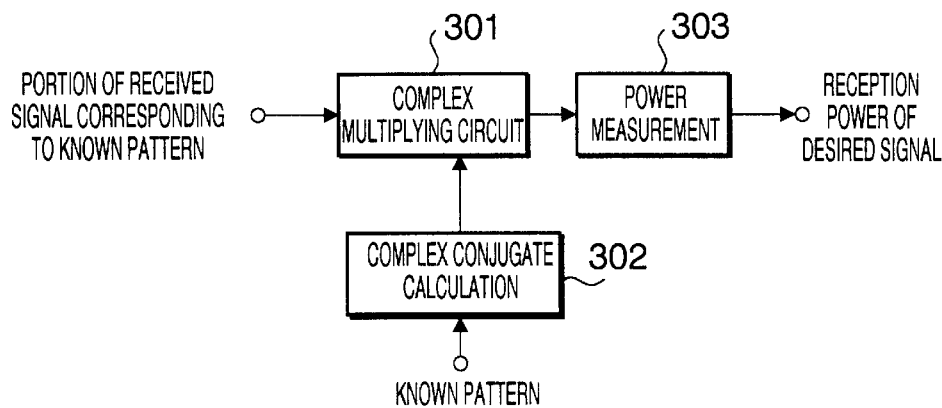
FIG. 3 is a block diagram for explaining a method, for measuring a received signal power of a desired signal, executed in the communication terminal illustrated in FIG. 2.

A circuit for measuring the received signal power of the desired signal is illustrated in FIG. 3. In this circuit, a portion of the received signal corresponding to a known pattern is extracted, and the portion is multiplied by the complex conjugate value of the known pattern in the complex multiplication circuit 301, where the known pattern is held by the radio base station apparatus, and the complex conjugate value is obtained by performing a complex conjugate calculation on the known pattern in the complex conjugate circuit 302. Then, the power measurement circuit 303 measures the power of the received signal based on the output of the complex multiplication circuit 301.

Figure 4:
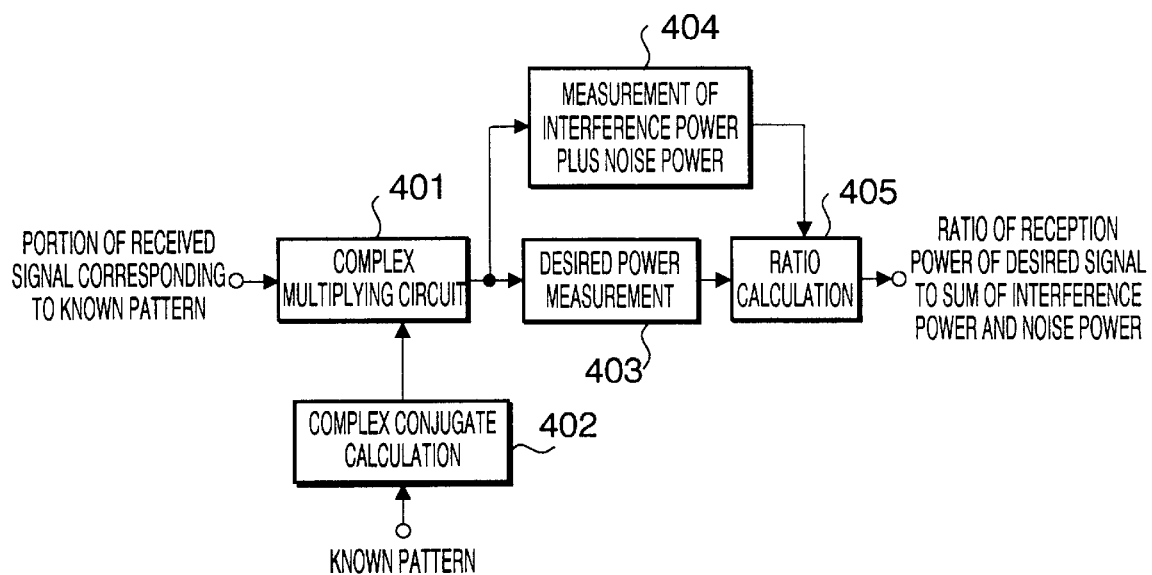
FIG. 4 is a block diagram for explaining a method, for measuring a ratio of the received signal power of the desired signal to a sum of a received signal power of an interference signal and a noise power, executed in the communication terminal illustrated in FIG. 2.
Figure 5:
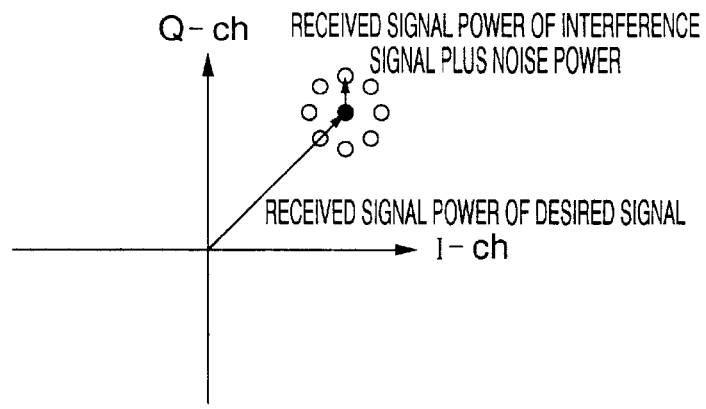
FIG. 5 is a diagram for explaining a method, for measuring a ratio of the received signal power of the desired signal to a sum of a received signal power of an interference signal and a noise power, executed in the communication terminal illustrated in FIG. 2.

FIG. 4 illustrates a circuit for measuring the SINR. In this circuit, a portion of the received signal corresponding to a known pattern is extracted, and the portion is multiplied by a complex conjugate value of a known pattern in the complex multiplication circuit 401 to obtain the position of the desired received signal on a complex plane (as indicated by a filled circle in FIG. 5), where the known pattern is held by the radio base station apparatus, and the complex conjugate value is obtained by performing a complex conjugate calculation on the known pattern in the complex conjugate circuit 402. Then, the power of the desired received signal is measured. In addition, the interference-power-plus-noise-power measurement circuit 404 measures a sum of the interference power and the noise power as an average value of a sum of squares of difference vectors between the position of the desired received signal (as indicated by the filled circle in FIG. 5) and the positions of the respective received signals (as indicated by unfilled circles in FIG. 5). Further, the power of the desired signal is measured by the desired power measurement circuit 403. Next, the ratio calculation circuit 405 calculates the ratio of the outputs of and the desired power measurement circuit 403 and the interference-power-plus-noise-power measurement circuit 404. Thus, the SINR is obtained.

The result of the reception quality measurement obtained as above is supplied to the multiplexing circuit 206. The multiplexing circuit 206 assigns transmission slots to the transmission data and the result of the reception quality measurement. The modulation circuit 207 modulates the transmission data. The transmission RF circuit 208 converts the frequency of the modulated transmission data, and amplifies the frequency-converted transmission data. Then, the transmission signal is transmitted from the antenna 201 through the antenna duplexer 202.

As described above, the communication terminal of FIG. 2 performs the measurement of the down-link signal transmitted from the radio base station apparatus of FIG. 1, and the result of the measurement is reported to the radio base station apparatus through the up link. The radio base station apparatus receives through the up link the result of the reception quality measurement by the communication terminal, and changes the antenna used in transmission based on the result of the reception quality measurement.

Figure 6:
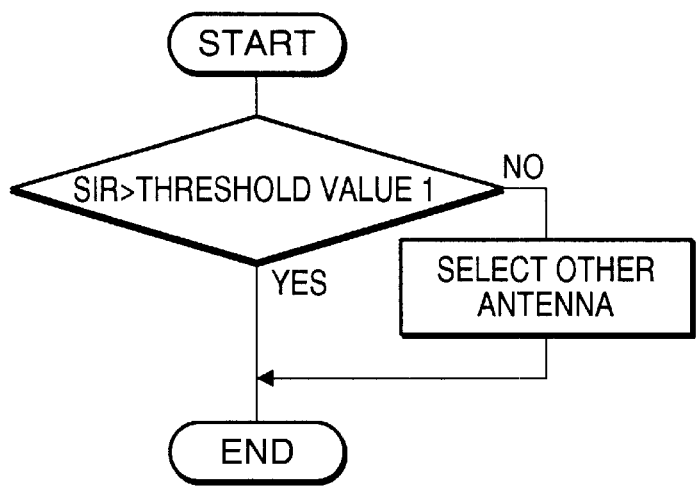
FIG. 6 is a flowchart for explaining an antenna change method executed in the radio base station apparatus in the above embodiment.

The operations of the antenna change control circuit are explained below in detail. FIG. 6 is a flow diagram of the antenna change control circuit. In FIG. 6, the result of the reception quality measurement is compared with a threshold value. Although the explanation is provided here for the case wherein the reception quality is represented by the SIR, similar operations are performed in the cases wherein the reception quality is represented by the received field strength, the received signal power of the desired signal, or the SINR.

When the result of the reception quality measurement (SIR) is greater than the threshold value 1, the antenna used in transmission is not changed. When the SIR is smaller than the threshold value 1, the antenna used in transmission is changed. For example, in the case wherein two antennas are provided, the antenna used in transmission is changed to the other antenna. Therefore, when a predetermined level is not achieved by the currently-used antenna, the antenna used in transmission is changed to another antenna. Thus, a good communication condition is maintained.

Figure 7:
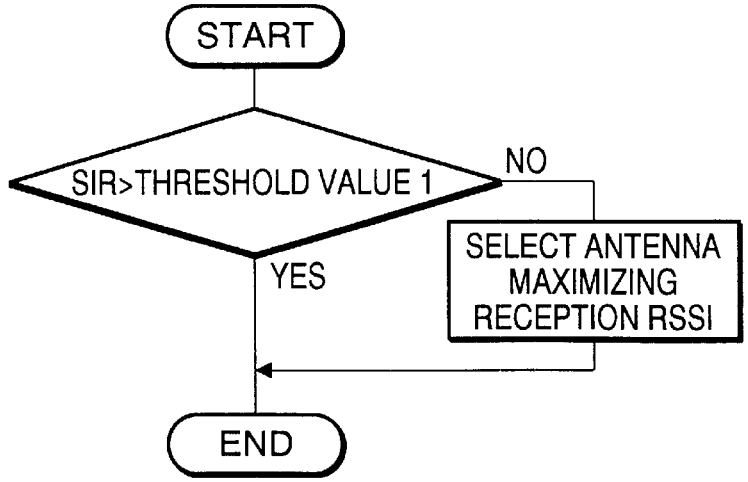
FIG. 7 is a flowchart for explaining an antenna change method executed in the radio base station apparatus in the above embodiment.

When more than two antennas are provided, the antenna used in transmission can be changed based on the received signal strength as illustrated in FIG. 7. For example, an antenna which maximizes a received signal strength indicator (RSSI) is selected. In this case, correlation between fading variations in up and down links in frequency division duplex systems is almost zero due to the difference in their carrier frequencies. Therefore, even if an antenna which maximizes the received field strength at the base station is selected for transmission, the selected antenna may not necessarily maximize the received signal power in the communication terminal.

However, when a line-of-sight link is not secured, received field strengths in both of the base station and the communication terminal are very small. That is, when the received field strength at one of the base station and the communication terminal is great, it can be recognized that a line-of-sight link is secured. Therefore, it is possible to avoid use of an antenna from which a communication path to an opposite communication apparatus is blocked. Thus, it is possible to exclude antennas for which a line-of-sight link is not secured, and the quality of transmission can be improved by changing the antenna.

Further, it is not necessary to choose the antenna which maximizes the received field strength. Instead, an arbitrary antenna may be used when the antenna realizes a received field strength at the base station which is equal to or greater than a certain threshold value.

The antenna of the base station can be changed by using the construction described above, and therefore degradation in transmission quality of the down link due to shadowing can be reduced. Although information on reception quality obtained by measurement at one station in a frequency division duplex system cannot be directly utilized for transmission therefrom, an antenna in the station can be changed based on information on reception quality obtained by measurement at an opposite terminal to avoid continuation of degraded reception quality at the opposite terminal.

First, the operation of reporting from the terminal to the base station apparatus is explained below. The report may be made constantly or when necessary. In the former case, i.e., when the report is made constantly, the antenna can be changed so that high reception quality is maintained. However, traffic is increased due to the constant reporting.

Figure 14:
FIG. 14 is a diagram illustrating a frame structure of data used in communication which employs the radio communication method according to the present invention.

In speech communications, speech information and control information may be multiplexed in a transmission slot as illustrated in FIG. 14. Therefore, constant reporting is possible in speech or low-speed communication systems.

Figure 15:
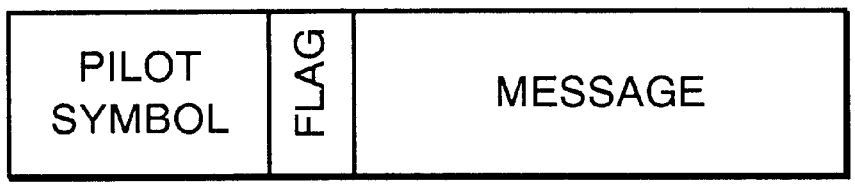
FIG. 15 is a diagram illustrating a frame structure of data used in communication which employs the radio communication method according to the present invention.
Figure 15:
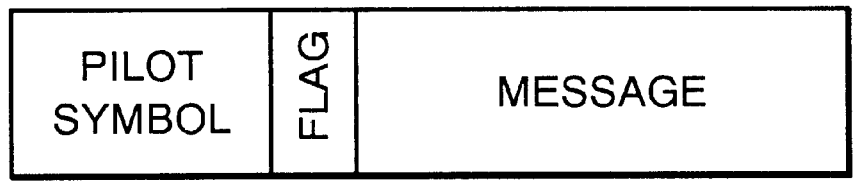

On the other hand, in the latter case in which the report is made as the need arises, increase in traffic is small. In packet communications which realize high-speed data transmission, it is preferable to report as the need arises. In the packet communications, bursty information is transmitted in a short time. Therefore, as illustrated in FIGS. 15(a) and 15(b), control information is not multiplexed into a slot. Instead, a flag indicating whether the information is a message or control information is used. In FIG. 15(a), the control flag indicates that the information is a message, and in FIG. 15(a), the control flag indicates that the information is control information. Therefore, when the report is made as the need arises, the report is transmitted in the format of FIG. 15(b), in which the control flag indicates that the information is control information.

Next, explanations are provided about the timing of the change of an antenna. The antenna may be changed in accordance with either of three methods as explained below.

Figure 16:
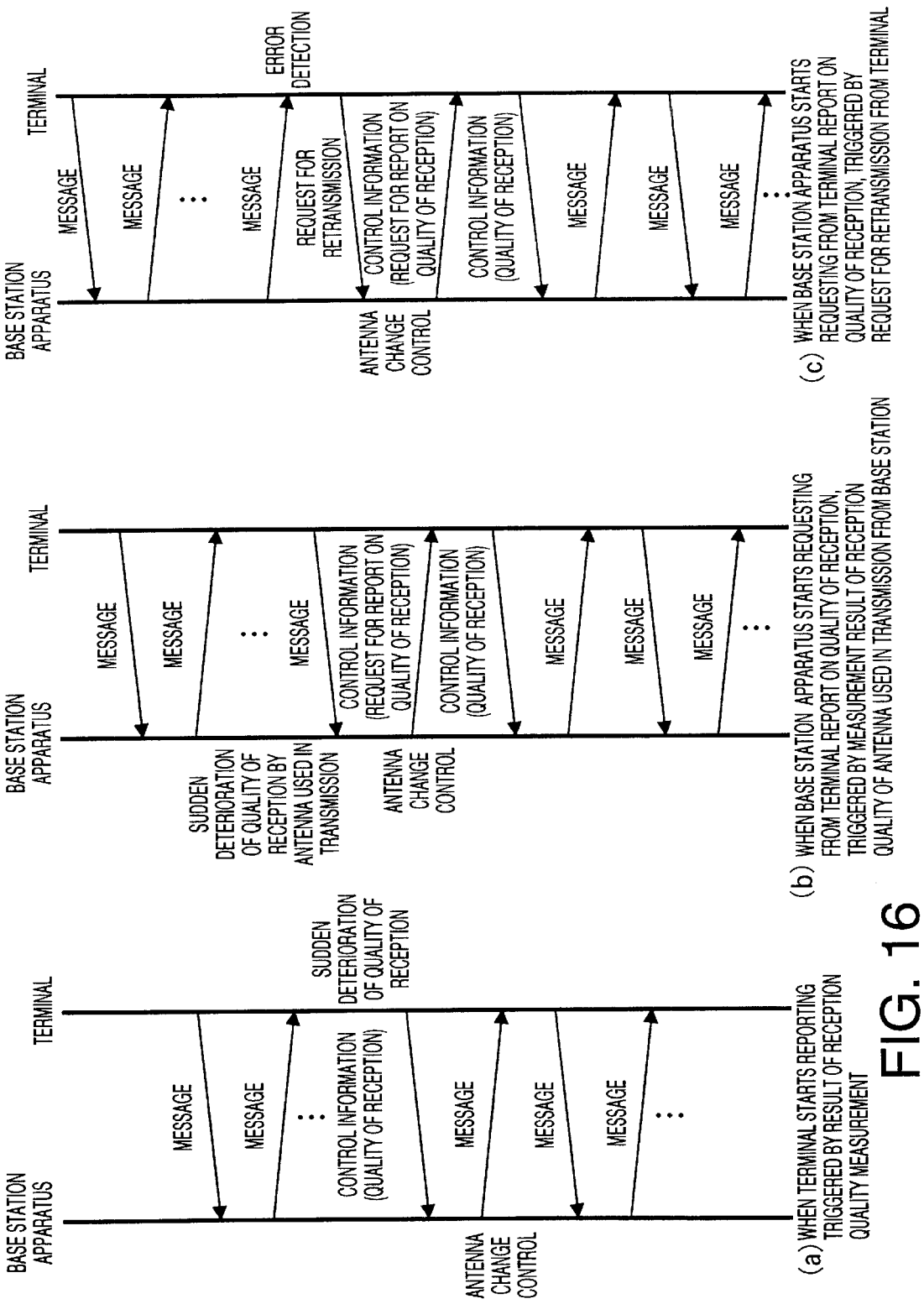
FIG. 16 is a sequence diagram illustrating the operations performed between the base station apparatus and the communication terminal according to the present invention.

The first method is explained with reference to FIG. 16(a). When the reception quality is obtained by measurement at the terminal, sometimes the reception quality is suddenly deteriorated. When in mobile communication, shadowing occurs, i.e., a line-of-sight link is not secured, the received field strength is suddenly reduced by tens of decibels. The terminal monitors the situation, and reports the situation to the base station. The base station apparatus changes the antenna in response to the report of the reception quality.

The second method is explained with reference to FIG. 16(b). The base station apparatus estimates by measurements the quality of reception by an antenna currently used for transmission and reception. If the reception quality is suddenly deteriorated, it is recognized that shadowing occurs, i.e., a line-of-sight link is not secured. Shadowing is caused by positions of the antennas of the communication terminal and the base station apparatus, and is not affected by the difference between the carrier frequencies. Therefore, when the reception quality at the base station is suddenly deteriorated, it is expected that the reception quality at the communication terminal is also suddenly deteriorated. Then, the base station sends to the communication terminal a request for a report on the reception quality at the communication terminal. The communication terminal estimates by measurement the quality of reception, and reports the estimated quality of reception to the base station apparatus. The base station performs antenna change control in accordance with the reported value representing the estimated quality of reception.

The third method is explained with reference to FIG. 16(c). When a message received by the communication terminal contains an error, the communication terminal sends to the base station a request for retransmission. In response to the request for retransmission, the base station sends to the communication terminal a request for a report on the reception quality at the communication terminal. The communication terminal estimates by measurement the quality of reception, and reports the estimated quality of reception to the base station apparatus. The base station performs antenna change control in accordance with the reported value representing the estimated quality of reception.

In addition, when the above three methods are combined appropriately, a delay in antenna change control can be reduced, and fine control can be realized.

Embodiment 2

Figure 8:
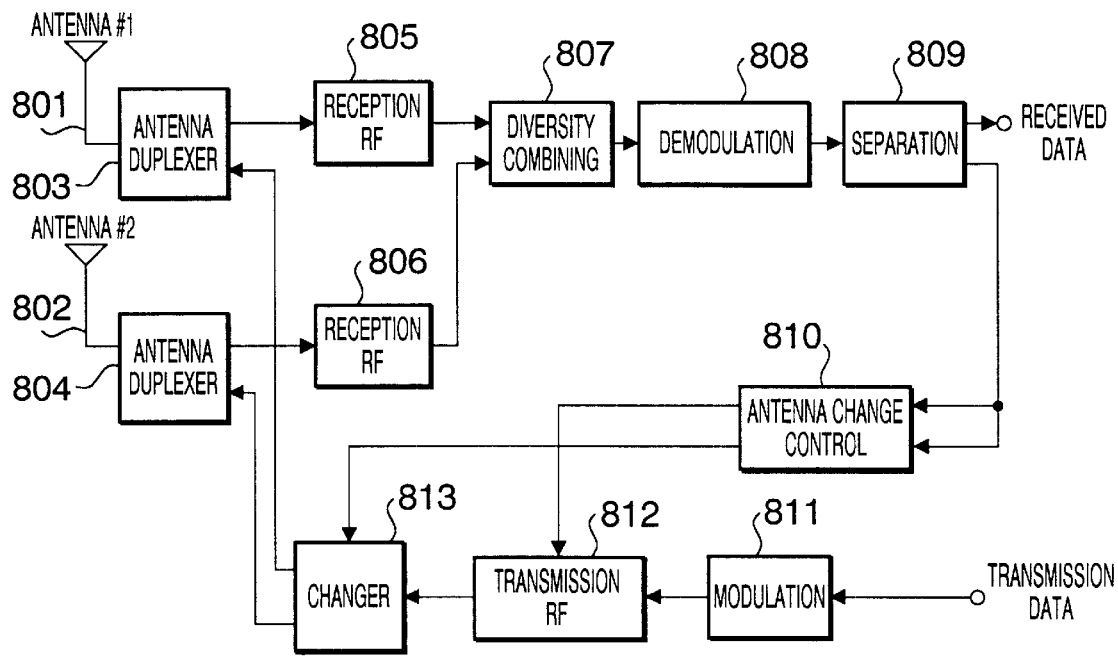
FIG. 8 is a block diagram illustrating a radio base station apparatus in the embodiment 2 of the present invention.

FIG. 8 is a block diagram illustrating the construction of the radio base station apparatus in the embodiment 2 of the present invention.

In the radio base station apparatus, a signal received through the antenna 801 is supplied to the reception RF circuit 805 through the antenna duplexer 803, which is provided for common use of the antenna 801 in transmission and reception. The reception RF circuit 805 amplifies the received signal, and performs frequency conversion to an intermediate frequency or a baseband frequency.

In addition, a signal received by the antenna 802 is supplied to the reception RF circuit 806 through the antenna duplexer 804, which is provided for common use of the antenna 802 in transmission and reception. The reception RF circuit 806 amplifies the received signal, and performs frequency conversion to an intermediate frequency or a baseband frequency.

The frequency-converted signals as diversity receptions are combined in the diversity combining circuit 807. Although the combination of the diversity receptions is not a necessary function, it is preferable to employ the diversity receptions for improving the performance of the reception since the present radio base station apparatus has a plurality of antennas. Next, the result of the diversity receptions is demodulated in the demodulation circuit 808. The result of the demodulation is then supplied to the separation circuit 809, and is separated thereby into reception data and a transmission power control signal.

The antenna change control circuit 810 determines, based on the transmission power control signal, which of the antennas 801 and 802 is to be used for transmission, and supplies to the changer 813 a signal for changing from the current antenna to the determined antenna. The operation of the antenna change control circuit 810 is explained later.

In transmission, transmission data is modulated in the modulation circuit 811 to be supplied to the transmission RF circuit 812. The transmission RF circuit converts the frequency of the transmission data, and amplifies the transmission data to be supplied to the changer 813. The changer 813 changes the antenna from one of the antennas 801 and 802 to the other, so that a transmission signal is transmitted through the antenna after the change.

Figure 9:
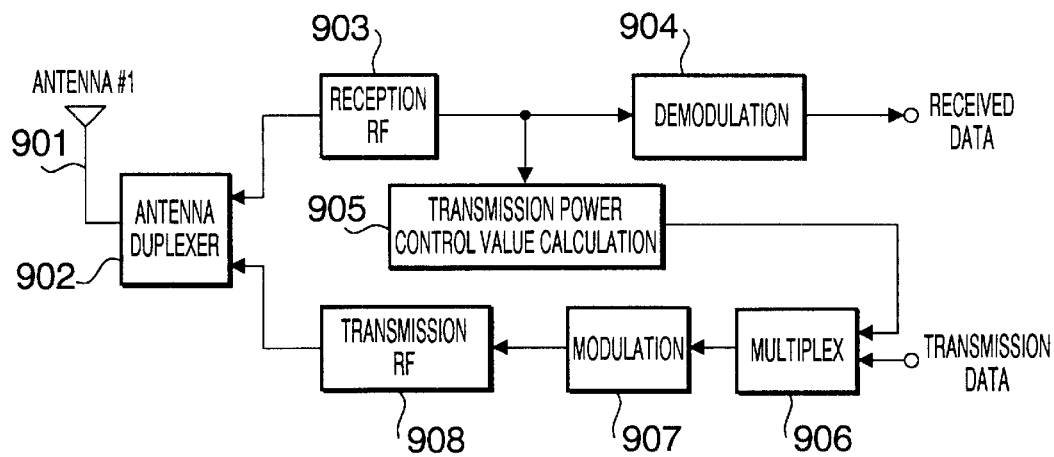
FIG. 9 is a block diagram illustrating a communication terminal which communicates with the radio base station apparatus in the embodiment 2 of the present invention.

FIG. 9 is a block diagram illustrating the construction of a communication terminal which performs radio communication with the radio base station apparatus in the embodiment 2 of the present invention.

A signal received by the antenna 901 is supplied to the reception RF circuit 903 through the antenna duplexer 902, which is provided for common use of the antenna 902 in transmission and reception. The reception RF circuit 903 amplifies the received signal, and performs frequency conversion to an intermediate frequency or a baseband frequency. The frequency-converted signal is demodulated in the demodulation circuit 904. At the same time, the output of the reception RF circuit is supplied to the transmission power control value calculation circuit 905, in which a transmission power control signal is determined.

The above transmission power control signal is determined, for example, based on received field strength, a received signal power of a desired signal, a ratio of a power of the received signal to an interference power (SIR), or a ratio of the power of the received signal to a sum of the interference power and a noise power (called Signal-to-Interference pulse Noise Ratio, and hereinafter referred to as SINR). In addition, information transmitted as the transmission power signal may contain one of two optional pieces of control information for increasing and decreasing the transmission power, one of three optional pieces of control information for increasing, maintaining, and decreasing the transmission power, or one of more than three optional pieces of control information for setting the control amount more finely.

Here, explanations are provided for the case wherein the two optional pieces of control information are used. When the transmission power control signal is determined based on the received field strength, the power of the output of the reception RF circuit is measured. When the measured power is greater than a threshold value 3, the control signal is generated so that the transmission power from the base station is decreased. When the measured power is smaller than the threshold value 3, the control signal is generated so that the transmission power from the base station is increased. The transmission power control signal based on the received field strength is produced by the simplest circuitry. In addition, the transmission power control signal based on the received field strength can be used in an environment in which no interference signal exists.

In the case wherein the transmission power control signal is determined based on the received signal power of the desired signal, first, the measurement is performed by multiplying the received signal by a known signal. When the interference signal exists, the received field strength includes both the desired signal and the interference signal, while information to be reported should be based on the received signal power of the desired signal which is needed in the communication terminal. Therefore, it is preferable to use the SINR for representing reception quality since the SINR is the most reliable information as an index for determining an error rate characteristic.

Figure 10:
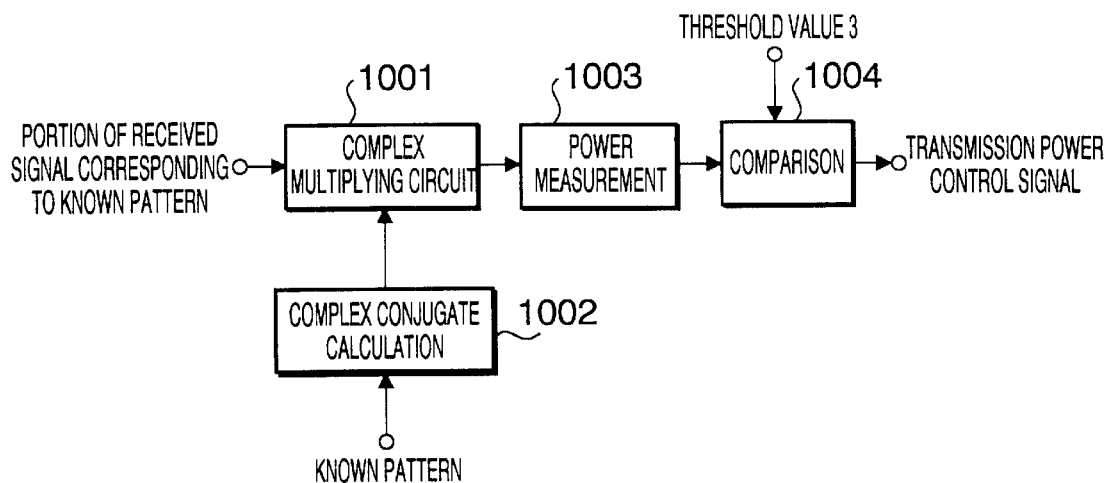
FIG. 10 is a block diagram for explaining a method for calculating a transmission power control amount based on a received signal power of a desired signal in the communication terminal illustrated in FIG. 9.

A circuit for measuring the received signal power of the desired signal is illustrated in FIG. 10. In this circuit, a portion of the received signal corresponding to the known pattern is extracted, and the portion is multiplied by the complex conjugate value of the known pattern in the complex multiplication circuit 1001, where the known pattern is held by the radio base station apparatus, and the complex conjugate value is obtained by performing a complex conjugate calculation on the known pattern in the complex conjugate circuit 1002. Then, the power measurement circuit 1003 measures the power of the received signal based on the output of the complex multiplication circuit 1001. The comparison circuit 1004 generates the control signal so that the transmission power from the base station is decreased when the measured power is greater than a threshold value 3, and the transmission power from the base station is increased when the measured power is smaller than the threshold value 3.

Figure 11:
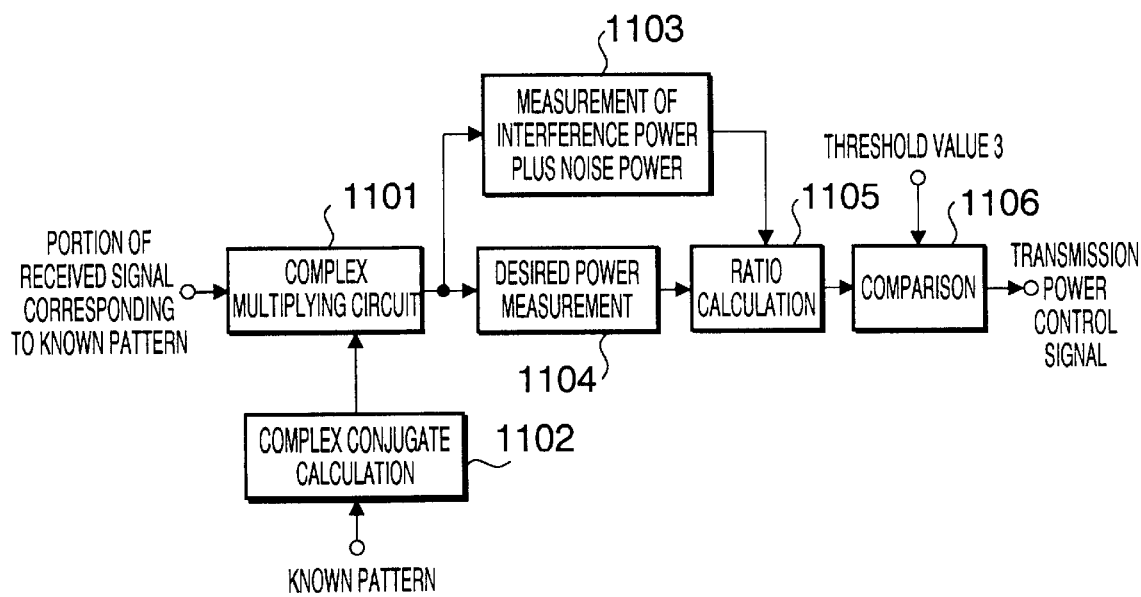
FIG. 11 is a block diagram for explaining a method for calculating a transmission power control amount based on a ratio of the received signal power of the desired signal to a sum of a received signal power of an interference signal and a noise power in the communication terminal illustrated in FIG. 9.

FIG. 11 illustrates a circuit for measuring the SINR. In this circuit, a portion of the received signal corresponding to a known pattern is extracted, and the portion is multiplied by a complex conjugate value of a known pattern in the complex multiplication circuit 1101 to obtain the position of the desired received signal on a complex plane (as indicated by the filled circle in FIG. 5), where the known pattern is held by the radio base station apparatus, and the complex conjugate value is obtained by performing a complex conjugate calculation on the known pattern in the complex conjugate circuit 1102. Then, the power of the desired received signal is measured. In addition, the interference-power-plus-noise-power measurement circuit 1104 measures a sum of the interference power and the noise power as an average value of a sum of squares of difference vectors between the position of the desired received signal (as indicated by a filled circle in FIG. 5) and the positions of the respective received signals (as indicated by unfilled circles in FIG. 5). Further, the power of the desired signal is measured by the desired power measurement circuit 1103. Next, the ratio is calculated from the outputs of the interference-power-plus-noise-power measurement circuit 1104 and the desired power measurement circuit 1103. The comparison circuit 1106 generates the control signal so that the transmission power from the base station is decreased when the measured power is greater than a threshold value 3, and the transmission power from the base station is increased when the measured power is smaller than the threshold value 3.

Next, explanations are provided for the case wherein the three optional pieces of control information are used. In this case, a threshold value 4 is used in addition to the threshold value 3. When the measured power ratio is smaller than the threshold value 3, the control signal is generated so that the transmission power from the base station is increased. When the measured power ratio is greater than the threshold value 3 and smaller than the threshold value 4, the control signal is generated so that the transmission power from the base station is maintained. When the measured power ratio is greater than the threshold value 4, the control signal is generated so that the transmission power from the base station is decreased.

In the case wherein more than three optional pieces of control information are used, a plurality of threshold values are provided, and the number of the threshold values are made smaller than the number of the optional pieces of control information by one. Thus, one of finely divided values of the control information is determined based on comparison with the plurality of threshold values.

The transmission power control information calculated as above is supplied to the multiplexing circuit 906. The multiplexing circuit 906 assigns transmission slots to the transmission data and the transmission power control information. The modulation circuit 907 modulates the transmission data, and the transmission RF circuit 908 converts the frequency of the modulated transmission data, and amplifies the frequency-converted transmission data. Then, the transmission signal is transmitted from the antenna 901 through the antenna duplexer 902.

As described above, the communication terminal of FIG. 9 generates the transmission power control signal based on the reception quality of the down-link signal transmitted from the radio base station apparatus of FIG. 8, and the transmission power control signal is reported to the radio base station apparatus through the up link. The radio base station apparatus receives through the up link the transmission power control signal generated by the communication terminal, and changes the antenna used in transmission based on the transmission power control signal generated by the communication terminal.

Since the antenna is changed according to the transmission power control, the amount of information transmitted from the communication terminal can be reduced. In addition, the radio base station apparatus monitors the transmission power control signal which determines the transmission power of the radio base station apparatus, and changes the antenna. Therefore, the transmission power of the radio base station apparatus can be maintained below a threshold value.

Figure 12:
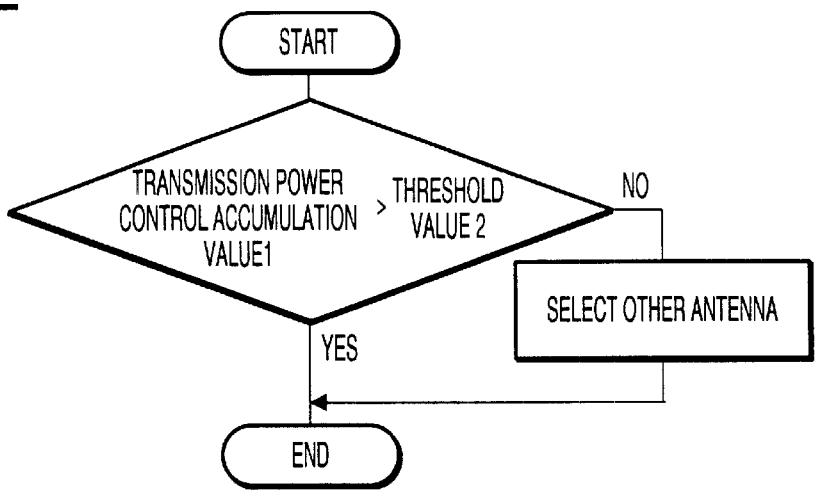
FIG. 12 is a flowchart for explaining an antenna change method executed in the radio base station apparatus in the above embodiment 2.

The operations of the antenna change control circuit are explained below in detail. FIG. 12 is a flow diagram in the case wherein the number of the antennas is two. In FIG. 12, the reported transmission power control information is accumulated. Then, the accumulated value of the reported transmission power control information is compared with the threshold value 2. This threshold value is determined based on the amount of the interference in the down link, where the interference is generated by increasing the transmission power or a limit value of the transmitter.

For example, in the case wherein the transmission power control amount in a CDMA communication system is determined based on the amount of the interference in the down link which is generated by increasing a transmission power, the threshold value is determined according to a spread-spectrum processing gain. For example, the threshold value for a transmission power in a transmission system with the spread-spectrum processing gain of 16 is made 16 times the threshold value for a transmission power in a transmission system with the spread-spectrum processing gain of 256 since the ratio of these spread-spectrum processing gains is 16. The amount of the interference varies with the spread-spectrum processing gain. Therefore, it is possible to finely set the maximum value of the transmission power change so that the antenna can be changed appropriately according to the spread-spectrum processing gain.

In FIG. 12, when the accumulated value of the transmission power control information is greater than the threshold value 2, the antenna is not changed. When the accumulated value of the transmission power control information is smaller than the threshold value 2, the antenna used at that time is changed to another antenna. In particular, in the case wherein the number of the antennas is two, the antenna used at that time is changed to the other antenna.

Figure 13:
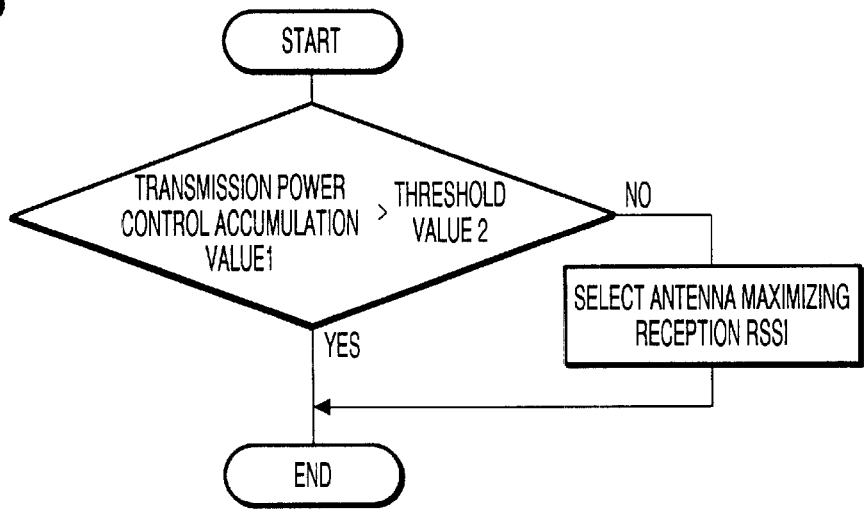
FIG. 13 is a flowchart for explaining an antenna change method executed in the radio base station apparatus in the above embodiment 2.

FIG. 13 is a flow diagram in the case wherein the number of the antennas is more than two. When more than two antennas are provided, the antenna used in transmission can be changed based on the received signal strength in addition to the accumulated value of the transmission power control information. For example, an antenna which maximizes a received signal strength indicator (RSSI) is selected. In this case, correlation between fading variations in up and down links in frequency division duplex systems is almost zero due to the difference in their carrier frequencies. Therefore, even if an antenna which maximizes a received field strength at the base station is selected for transmission, the selected antenna may not necessarily maximize the received signal power in the communication terminal.

However, when a line-of-sight link is not secured, received field strengths in the base station and the communication terminal are very small. Therefore, it is possible to avoid use of an antenna for which a line-of-sight link is not secured.

In addition, instead of the antenna which maximizes the received field strength at the base station, an arbitrary antenna which realizes a received field strength at the base station which is greater than a certain threshold value, may be selected for transmission.

There are two methods for setting the transmission power in the base station. In the first method, the transmission power is not changed when the antenna used for transmission is changed, and in the second method, the transmission power is reduced by a constant value when the antenna used for transmission is changed. The first method is surely effective in improving reception quality of the terminal. It is sufficient to supply the transmission power control signal to the transmission RF circuit, in addition to the antenna change control circuit 810. The transmission RF circuit controls operations of increasing and decreasing the transmission power based on the transmission power control signal.

If a great transmission power is maintained after the quality of the link to the terminal is improved for a terminal, such a great transmission power can cause a large amount of interference in other terminals. According to the second method, the transmission power to be set is decreased by the constant amount when the antenna is changed. For realizing the second method, it is sufficient to modify the transmission power control signal, which is supplied to the antenna change circuit 810, so that the transmission power control signal also function as a control signal which reduce the transmission power by the constant amount when the antenna is changed. The transmission RF circuit controls operations of increasing and decreasing the transmission power based on the transmission power control signal. At this time, the accumulated value of the transmission power control signal must also be reduced by a constant amount. When provision is made as above, it is possible to avoid excessive improvement in the quality of the link by the antenna change, and to reduce the interference power.

Regarding the above constant value, for example, if the transmission power is reduced by 3 dB in CDMA systems, it is possible to add an additional terminal with which communication is performed with the same spread-spectrum processing gain as the existing terminals.

In addition to the transmission power control information, the reception quality may also be reported to the base station apparatus by the terminal in the same manner as the embodiment 1. In particular, the operations of reporting from the terminal to the base station apparatus and the timing thereof are the same as the embodiment 1.

Usually, the antenna change control is performed based on the accumulated value of the transmission power control information. In addition, the information on the reception quality is reported to the base station apparatus by the communication terminal when the reception quality at the communication terminal is suddenly deteriorated, so that the base station apparatus can perform the antenna change control. Therefore, it is possible to avoid selection, of an antenna from which a link to the terminal is blocked, by a small amount of transmission power control at a short interval, and an antenna realizing a high quality link is selected with a higher probability. That is, the transmission antenna change control becomes more advantageous.

When the base station apparatus receives from the communication terminal a request for retransmission such as an ARQ control information, the base station sends to the communication terminal a request for a report on the reception quality at the communication terminal. The communication terminal estimates by measurement the quality of reception, and reports the estimated quality of reception to the base station apparatus. The base station apparatus performs antenna change control in accordance with the reported value representing the estimated quality of reception.

The antenna of the base station can be changed by using the construction described above, and it is possible to suppress degradation in transmission quality of the down link due to shadowing. In particular, in CDMA systems, it is possible to perform fine control of antenna change by having a criterion for the antenna change based on the spread-spectrum processing gain.

The above explanations are provided for the case wherein the base station apparatus has the construction of FIG. 1 or 8, and the communication terminal has the construction of FIG. 2 or 9. Instead, the present invention can also be applied to the case wherein the communication terminal has the construction of FIG. 1 or 8, and the base station apparatus has the construction of FIG. 2 or 9.

As described above, according to the radio base station apparatus and the radio communication method of the present invention, the antenna change can be started when the reception quality is suddenly deteriorated. In addition, by selecting an antenna realizing a reception field strength which is greater than a certain value, it is possible to avoid selection of an antenna which causes a line failure due to shadowing with a high probability.

The present description is based on Japanese Patent Application No. HEI10-94953, filed Apr. 7, 1998, the contents of which is incorporated herein by reference.

INDUSTRIAL APPLICABILITY

The present invention is applicable to radio base station apparatuses and communication terminals in digital radio communication systems.

What is claimed is:

1. A transmission diversity method in frequency division duplex communications between a base station apparatus with a plurality of antennas and a communication terminal, the method comprising:

reporting, in the communication terminal, at least one of reception quality information and transmission power control information to the base station apparatus;

switching transmission antennas, based on the transmission power control information reported from the communication terminal, or based on the reception quality information reported from the communication terminal when the reception quality decreases in one of the base station apparatus and the communication terminal or when the base station apparatus receives a request for retransmission from the communication terminal, while avoiding use of an antenna which provides a low received field strength of a signal received from the communication terminal and for which a line-of-sight link is not secured; and reducing the transmission power of an antenna in use after said switching, to a level lower than transmission power of an antenna in use before said switching.

2. The method according to claim 1, wherein the antenna in use after said switching provides for signal strength determined to be sufficient to support a communication, the signal strength greater than signal strength of at least another antenna of the plurality of antennas.

* * * * *